United States Patent [19]
Rossmere et al.

[11] Patent Number: 5,210,711
[45] Date of Patent: May 11, 1993

[54] VERY FAST VARIABLE INPUT MULTI-BIT ADDER

[75] Inventors: David Rossmere, San Jose; Patrice Capitant, Los Altos, both of Calif.

[73] Assignee: Sony Corporation of America, Park Ridge, N.J.

[21] Appl. No.: 842,220

[22] Filed: Feb. 26, 1992

[51] Int. Cl.⁵ .............................................. G06F 7/50
[52] U.S. Cl. .................................................. 364/786
[58] Field of Search ............... 364/768, 783, 784, 786, 364/787

[56] References Cited

U.S. PATENT DOCUMENTS

| | | | |
|---|---|---|---|
| 3,535,502 | 10/1970 | Clapper | 364/786 |
| 3,906,211 | 9/1975 | Glaser | 364/786 |
| 5,134,579 | 7/1992 | Oki et al. | 364/786 |

*Primary Examiner*—Jerry Smith
*Assistant Examiner*—Chuong D. Ngo

*Attorney, Agent, or Firm*—Blakely, Sokoloff, Taylor & Zafman

[57] ABSTRACT

A method and apparatus for quickly adding at least three multi-bit binary numbers. The addition is divided into two stages. In Stage I, each of the addends are grouped into like-ordered multi-bit clusters and the corresponding clusters of the addends are added together using Programmable Read Only Memory (PROM) integrated circuits (ICs) yielding several intermediate sums. In Stage II, the intermediate sums are combined to yield a final sum using Programmable Array Logic (PAL, PAL is a trademark of Monolithic Memories, Inc.) ICs. Furthermore, the final sum is rounded in Stage I (and clipped if necessary in a third stage) before being provided as output. Clipping is achieved by setting the output sum to zero if the final sum is negative and setting the output sum to a predetermined threshold value if the final sum exceeds the threshold value.

36 Claims, 11 Drawing Sheets

********* Note: This is the PROM for the MSB's which does NOT add
                the rounding bit but does invert the MSbit of each
                addend                                     ********

*/ include <stdio.h>
include <string.h> char   FirstAdd, SecondAdd, ThirdAdd, Num1, Num2, Num3, RoundBit,
         Sum[50] ;
long   i, j, k, n ;
FILE   *TestFile ;
int    numb ;

/* The following information is used for writing the hex file in the
format required by the PROM programmer. */

FILE   *HexFile ;
char   eofrecord[] = ":00000001FF";
unsigned int addr;
char   s[132] ;
int    make_record (char *s, char *b, unsigned int add, int ndata);

/* This is the start of the actual program. */ int main ()
{
      /* Open the hex file and set address to 0. This is for the PROM
      programmer. */
      addr = 0 ;
      HexFile = fopen ("hexMSB", "w") ;

TestFile = fopen ("PROMFile", "wb") ; /* This is a file for
      debugging the program. */
      RoundBit = 2 ;        /* Not used in this PROM. */

/* This is where the actual values are calculated. The
addresses into the PROM are organized as follows: Addr0-4 = Green
Data; Addr5-9 = Blue Data; Addr10-14 = Red Data. When all inputs
are 0 the sum & carry's = 0. This corresponds to the first PROM
location (Addr 0). Addr 1 of the PROM corresponds to nothing   (0)
on the Red and Blue data lines and a 1 on the Green data lines. Addr
31 (000 0000 0001 1111 in binary) of the PROM represents a 31 on
the Green data lines and nothing on Red or Blue. Addr 32 (000 0000
0010 0000 in binary) corresponds to a 0 on the Green data lines, a 1
on the Blue data lines and a 0 on the Red data lines. The C code
below implements this through 3 different loops.
```

FIGURE 5b the values used in the sum are modified to perform Offset 2's Complement arithmetic. This requires that the MSB of each addend be inverted. This is accomplished by adding 16 to the input modulo 32. For example if the Red input value is 5 (00101) then the Offset 2's Complement value is 5 + 16 = 21 (10101). If the Red input is 19 (10011) then the actual addend is 19 + 16 = 21 (10101). If the Red input is 19 (10011) then the actual addend is 19 + 16 = 35 modulo32 = 3 (00011). */

```
for (thirdAdd=0; thirdAdd<32; ThirdAdd++)   /* Loop represents
the top 5 bits (Red) */
    {
    Num3 = (ThirdAdd + 16) % 32 ;
    for (SecondAdd=0; secondAdd<32; FirstAdd++)   /* Loop for
    middle 5 bits (Blue) */
        {
        Num2 = (SecondAdd + 16) % 32 ;
        n = 0 ;
        for (firstAdd=0; FirstAdd<32; firstAdd++)   /* Loop for
        lower 5 bits (Green) */
            {
            Num1 = (FirstAdd + 16) % 32 ;
            Sum[n] = Num1 + Num2 + Num3;
            n++ ;
            }

/* The remainder of this code is used only to format the
        data for the PROM programmer. */ numb = fwrite (&Sum[0], sizeof(Sum[0]), 32, TestFile) ;
        /*   For debugging only.*/

/* create hex record and send it */
        make_record (s, &Sum[0], addr, 32);
        fprintf(HexFile, "%s/n",s);
        addr += 32;
        }
    }
fclose(Testfile) ;

/* write end of file to hex file and close it */
fprintf(HexFile, "%s"n", eofrecord);
fclose(HexFile);

/* return to os */
return (0);
}
```

******** NOTE;  This is the PROM for the middle bits (Other
significant        Bits) which does NOT add the rounding bit or
invert the         MSB. ******

*/ include <stdio.h>
include <string.h> char  FirstAdd, SecondAdd, ThirdAdd, Roundbit, Sum[50];
long  i, j, k, n;
FILE  *TestFile ;
int   numb ;

/* The following information is used for writing the hex file in the
format reqired by the PROM programmer.  */

FILE *HexFile ;
char eofrecord[] = ":00000001FF";
unsigned int addr ;
char s[132] ;
int make_record(char *s, char *b, unsigned int add, int  ndata);

/* This is the start of the actual program.  */ int main()
{
/* Open the hex file and set address to 0.  This is for the PROM
programmer.  */
        addr = 0;
        HexFile = fopen("hexOSB", "w") ;

TestFile = fopen ("PROMFile", "wb") ; /* This is a file for debugging
the program.  */
RoundBit = 2 ;             /* This is not used in this PROM */

/* This is where the actual values are calculated.  The addresses into
the PROM are organized as follows:  Addr0-4 = Green Data; Addr5-9 =
Blue Data;  Addr10-14 = Red Data.  When all inputs are 0 the sum &
carry's = 0.  This corresponds to the first PROM location (addr 0).
Addr 1 of the PROM corresponds to nothing  (0) on the Red and Blue
data lines and a 1 on the Green data lines.  Addr 31  (000 0000 0001
1111 in binary) of the PROM represents a 31 on the Green data lines
and nothing on Red or blue.  Addr 32 (000 0000 0010 0000 in
binary)  corresponds to a 0 on the Green data lines,  a 1 on the Blue
data lines and a 0 on the red data lines.  The C code below
implements this through 3 different loops.  */
```

FIGURE 6b

```
for (ThirdAdd=0;  thirdAdd<32;  ThirdAdd++)   /* Loop represents the
top 5 bits (Red) */
      {
      for (SecondAdd=0;  SecondAdd<32;  second Add++)  /* Loop for
      middle 5 bits (Blue) */
            {
            n=0;
            for (FirstAdd=0;  firstAdd<32;  FirstAdd++)  /* Loop for
            lower 5 bits (Green) */
                  {
                  Sum [n] = FirstAdd + SecondAdd + ThirdAdd ;
                  n++ ;
                  }

/* The remainder of this code is used only to
            format the data for the PROM programmer. */

/* For debugging use only. */ numb = fwrite (&Sum[0], Sizeof(Sum[0]), 32,
            TestFile) ;

/* create hex record and send it */
            make_record (s, &Sum [0], addr, 32);
            fprintf(HexFile, "%s\n",s);
            addr +=32;
            }
      }
      fclose(TestFile);

/* write end of file to hex file and close it */
      fprintf(hexFile, "%s\n", eofrecord);
      fclose(HexFile);

/* return to os */
      return(0);
}
```

FIGURE 7a

```
/***********NOTE: This is the LSB PROM which adds the ronding
bit.**********

*/ include <stdio.h>
include <string.h> char  FirstAdd, SecondAdd, ThirdAdd, RoundBit, Sum [50] ;
long  i, j, k, n ;
FILE  *TestFile ;
int   numb ;

/* The following information is used for writing the hex file in the
format required by the PROM programmer. */

FILE *HexFile ;
char eofrecord[] = ":00000001FF";
unsigned int addr;
char s[132] ;
int make_record(char *s, char *b, unsigned int add, int ndata);

/* This is the start of the actual program. */ int main()
{
    /* Open the hex file and set address to 0. This is for the PROM
programmer. */
addr = 0;
HexFile = fopen("hexLSB", "w") ;

TestFile = fopen("PROMFile", "wb")  ;/* This file is for debugging the
program.  */

RoundBit = 2 ;   /* This is used to round the result to 16 bits */

/* This is where the actual values are calculated.  The addresses into
the PROM are organized as follows:  Addr0-4 = Green Data; Addr5-9 =
Blue Data; Addr10-14 = Red Data.  When all inputs are 0 the sum &
carry's = 0.  This corresponds to the first PROM location (Addr 0).
Addr 1 of the PROM corresponds to nothing (0) on the Red and Blue
data lines and a 1 on the Green data lines.  Addr 31 (000 0000 0001
1111 in binary) of the PROM represents a 31 on the Green data lines
and nothing on Red or Blue.  Addr 32 (000 0000 0010 0000 in
binary) corresponds to a 0 on the Green data lines, a 1 on the Blue
data lines and a 0 on the Red data lines.  The C code below
implements this with 3 different loops.  */
```

FIGURE 7b

```
for (ThirdAdd=0; ThirdAdd<32; SecondAdd++)   /* Loop represents the
top 5 bits (Red)*/

{
    for (SecondAdd=0; SecondAdd<32; SecondAdd++)   /* Loop for
    middle 5 bits (Blue) */
        { n = 0 ;
        for (FirstAdd=0;  FirstAdd<32;  FirstAdd++)  /*  Loop for
        lower 5 bits (Green) */
            {
            Sum[n] = FirstAdd + SecondAdd + ThirdAdd +
            RoundBit ;
            n++ ;
            }

/* The remainder of this code is used only to format the
        data for the PROM programmer. */

/* For debugging use only. */
        numb = fwrite(&Sum[0], sizeof (Sum[0]), 32, TestFile) ;

/* create hex record and send it */
        make_record (s, &Sum[0],  addr, 32) ;
        fprintf(HexFile, "%s\n",s);
        addr += 32;
        }
    }
    fclose(TestFile);

/* write end of file to hex file and close it */
    fprintf(HexFile, "%s\n", eofrecord);
    fclose(HexFile);

/* return to os */
    return (0) ;

}
```

VERY FAST VARIABLE INPUT MULTI-BIT ADDER

BACKGROUND OF THE INVENTION

1. Field of the Invention

This invention relates to method and apparatus for adding more than two multi-bit inputs.

2. Art Background

Digital integrated circuity, such as adder integrated circuits (ICs), that perform the binary addition of two input values are well known and widely used. Binary refers to the base-2 number system, in which values are expressed as combinations of two digits, 0 and 1. Binary digits are called bits. There are as many number based systems as there are numbers, but only a few number based systems are commonly used. Human beings generally represent numbers using the base-10 number system. Binary digital computers, on the other hand, represent information based on two states, logical ON and logical OFF. While many binary encoding schemes exist, it is common for binary digital computers to represent numbers internally using the base-2 number system and then convert numbers to base-10 when the numbers must be interpreted by humans.

The base of a number system is called its radix. Regardless of the radix used in a number system, the position of a digit with respect to a radix point (i.e. the place) is used to evaluate the number. The radix point is the period or other character that separates the integer portion of a number from the fractional portion. Depending upon the place of a digit in a number, each digit is multiplied by a power of the radix and the products are summed when the number is evaluated. The order of a place is the power to which a radix is raised when evaluating a digit located in that particular place.

In the base-10 system, a radix point is called a decimal point. The position of each base-10 digit with respect to the decimal point (i.e. the decimal place) provides the information necessary to evaluate a base-10 number. Thus the base-10 number 13.5 represents $(1 * 10^1) + (3 * 10^0) + (5 * 10^{-1})$. Within a base-10 number, the decimal place in which a particular base-10 digit is located determines the order for the particular base-10 digit. In the base-10 number 13.5, the base-10 digit 3 in the one's place would have an order of zero because 3 is multiplied by 10 to the zeroeth power when evaluating the number. The same number represented by the base-10 number 13.5 would be depicted by 1101.1 as a binary number. That is because the binary number 1101.1 represents $(1 * 2^3) + (1 * 2^2) + (0 * 2^1) + (1 * 2^0) + (1 * 2^{-1})$ (which is the same as the sum of the base-10 numbers $8 + 4 + 0 + 1 + 0.5$).

Various schemes are commonly used to represent binary numbers. Offset binary representation is commonly used in analog/digital (A/D) and digital/analogue (D/A) conversions. In offset binary representation, half the largest possible number is substrated to get the value represented. This has the advantage that the number sequence from the most negative to the most positive is a simple binary progression. The most significant bit (MSB) carries the sign information, and zero appears only once. The method most widely used for integer computation is called two's complement ("2's complement"). In this system, positive numbers are represented as simple unsigned binary numbers. The system is contrived such that a negative number is then represented as the binary number that would be added to a positive number of the same magnitude to yield zero. A negative number is formed by complementing each of the bits of the positive number and then adding one. A one in the MSB indicates a negative number and there is only zero in this system. Arithmetic is simple in 2's complement because the sign information is carried in the MSB. To add two numbers, one simply adds them bitwise starting with the least significant bit (LSB). A carry from a lower bit is added into the next higher bit. A carry from the sign bit, i.e., the MSB, is simply ignored.

It is common in the art to perform addition using a combinational circuit. A half-adder is a combinational circuit that performs the arithmetic addition of two binary digits. The input variables of a half-adder are called augend and addend bits (X and Y, respectively, in this example). The output variables are called the sum and carry (S and C, in this example). The Table below depicts the truth table for a half-adder.

TABLE 1

| INPUTS | | OUTPUTS | |
|---|---|---|---|
| X | Y | C | S |
| 0 | 0 | 0 | 0 |
| 0 | 1 | 0 | 1 |
| 1 | 0 | 0 | 1 |
| 1 | 1 | 1 | 0 |

A truth table depicts the output variable values for every possible combination of input variable values. From the truth table it may be seen that when the input variables X and Y both have the value of zero, the output variables (sum and carry) will also have the value of zero. Similarly, when X and Y are both one, the sum will be zero and the carry will be one. Finally, when, either X is zero and Y is one, or when Y is zero and X is one, the sum will be one and the carry will be zero. Stated another way, the C output is zero unless both inputs are one and the S output is one unless both inputs are the same. Thus, Boolean functions may be obtained directly from the truth table: C=X AND Y; S=X XOR Y. Logic circuitry for this relationship consists of an exclusive-OR gate with X and Y as inputs and S as an output and an AND gate with X and Y as inputs and C as an output.

It is possible to design combinational circuitry of greater complexity. However, certain applications arise so frequently that off-the-shelf integrated circuits are available which permit a designer to forego the difficulty of designing specialized combinatorial circuitry for a particular need. One such commonly required application is a four-bit adder.

A four-bit adder adds a first four bit number to a second four bit number generating a four bit sum plus a carry bit. It is common to "expand" adders to add larger numbers. For example, two eight-bit numbers can be added using two four-bit adders by summing the four LSBs of the addends in one four-bit adder (the LSB adder) and the four MSBs of the addends plus the carry bit from the LSB addition in the other four-bit adder (the MSB adder). The carry bit from the MSB adder provides the ninth bit for the resulting sum which is formed by combining the four LSBs output from the LSB adder with the four MSBs output from the MSB adder.

However, conventional off-the-shelf adder ICs are only capable of adding two numbers at a time. Furthermore, they are too slow to accommodate large numbers (greater than 16 bits) in very fast applications. In an application requiring fast, complex addition such as matrix manipulation and digital signal processing (DSP) applications, it may be necessary to add more than two very large numbers at speeds above 20 MHz. It may also be necessary to clip negative sums to zero and positive sums above a threshold to that threshold. Using typical four-bit "fast" adder ICs and designing for worst case conditions would require four pipeline stages and roughly 32 16-bit equivalent ICs for this operation. The method and apparatus of the present invention can accomplish this task in three pipeline stages and require only 16 16-bit equivalent ICs.

SUMMARY OF THE INVENTION

It is therefore an object of the present invention to provide a very fast adder which can add more than two large multi-bit numbers.

It is further an object of the present invention to provide a very fast multi-bit adder which can round the resulting sum to the nearest whole number and clip an out-of-range sum to the nearest number delineating the range boundary.

It is also an object of the present invention to provide a very fast multi-bit adder which uses a minimum number of ICs thereby providing an adder which is simple to debug and support.

The present invention comprises a class of fast adders which can add M binary numbers that have a precision of N-bits where M and N can be any integer. The add function is divided into two stages. Programmable Read Only Memory (PROM) is utilized for Stage I adders. Offset 2's complement Arithmetic is used to implement the addition.

In the first stage, the addends are divided into groups of distinct contiguous order bits and the equivalent-ordered groups are summed yielding the same number of intermediate sums as the number of groups into which each addend was divided. Each of the sums resulting from the first phase are combined in the second phase in a bitwise fashion maintaining the orderness of the information to provide the multi-bit sum of the addends. In an optional third stage, the stage II multi-bit sum is clipped if it is out of bounds.

BRIEF DESCRIPTION OF THE DRAWINGS

The objects, features and advantages of the variable input multi-bit adder of the present invention will be apparent from the following detailed description of the preferred embodiment in which:

FIGS. 5a and 5b contain C code used to program the MSB Stage I PROM.

FIGS. 6a and 6b contain C code used to program intermediate significant bits Stage I PROMs.

FIGS. 7a and 7b contain C code used to program the LSB Stage I PROM.

DETAILED DESCRIPTION OF THE INVENTION

Figure 1:
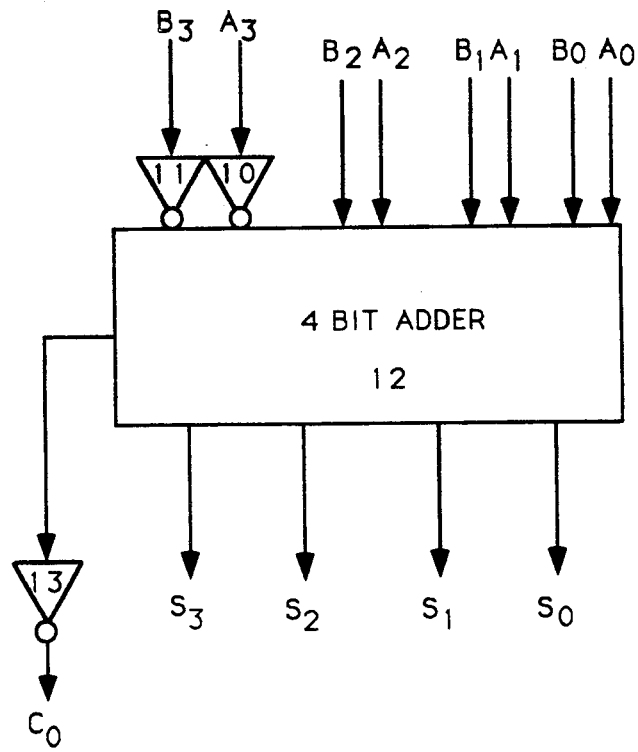
FIG. 1 illustrates offset 2's complement addition using an off-the-shelf four-bit adder IC.

The present invention comprises a fast adder circuit which can accept a variable number of multi-bit inputs and create a final sum with a minimum number of ICs. It has wide spread use in operations which require fast, complex addition such as matrix manipulation and DSP applications. As will be described below in the preferred embodiment of the present invention, three 20-bit numbers are added together at a frequency of 20 MHz. Furthermore, negative sums are clipped to zero and positive sums above a threshold are clipped. While the invention has been described in conjunction with the preferred embodiment, it will be evident to one skilled in the art that numerous alternative modifications, variations and uses will be apparent to those skilled in the art in light of the following description.

The addition of a variable number of multi-bit inputs is achieved utilizing an offset 2's complement number system. The offset 2's complement number system is itself a transformation of the 2's complement number system which is commonly used in the art to perform addition. Although 2's complement arithmetic is frequently used in arithmetic operations, offset 2's complement is not used because of the additional overhead required in performing the operation.

Each number in the offset 2's complement number system is formed by adding an offset to the 2's complement representation of the number. As offset 2's complement numbers are added together, the offset is also added into the sum multiple times. For this reason, a number system like the offset 2's complement system does not appear to be suitable for use in addition. Hence descriptions of offset 2's complement arithmetic do not appear in the prior art. As will be described below, the adder of the present invention includes an innovative way to implement offset 2's complement arithmetic which eliminates the need to evaluate all the intermediate sums or keep track of the intermediate carrys as would be required if ordinary 2's complement addition were used while avoiding the shortcomings found in the prior art.

The 2's complement of a number is formed by complementing each bit and adding one. One may form an x-bit offset 2's complement space by adding $2^{x-1}$ to each 2's complement number in the x-bit 2's complement space. This is the same as changing the MSB of each number in 2's complement space to a one if it is a zero and to a zero if it is a one. In an offset 2's complement system, negative numbers are easily detected because they have a zero in their MSB and non-negative numbers have a one in their MSB.

In a 3-bit system, eight ($2^3$) numbers may be represented. Table 2 below depicts 2's complement and offset 2's complement 3-bit number systems having a space which ranges from $-4$ to 3.

TABLE 2

| DECIMAL | 2'S COMPLEMENT | OFFSET 2'S COMPLEMENT |
|---|---|---|
| 3 | 011 | 111 |
| 2 | 010 | 110 |
| 1 | 001 | 101 |
| 0 | 000 | 100 |
| −1 | 111 | 011 |
| −2 | 110 | 010 |

TABLE 2-continued

| DECIMAL | 2'S COMPLEMENT | OFFSET 2'S COMPLEMENT |
|---|---|---|
| −3 | 101 | 001 |
| −4 | 100 | 000 |

Similarly, Table 3 below depicts 2's complement and offset 2's complement 4-bit systems which have a space which ranges from −8 to 7.

TABLE 3

| DECIMAL | 2'S COMPLEMENT | OFFSET 2'S COMPLEMENT |
|---|---|---|
| 7 | 0111 | 1111 |
| 6 | 0110 | 1110 |
| 5 | 0101 | 1101 |
| 4 | 0100 | 1100 |
| 3 | 0011 | 1011 |
| 2 | 0010 | 1010 |
| 1 | 0001 | 1001 |
| 0 | 0000 | 1000 |
| −1 | 1111 | 0111 |
| −2 | 1110 | 0110 |
| −3 | 1101 | 0101 |
| −4 | 1100 | 0100 |
| −5 | 1011 | 0011 |
| −6 | 1010 | 0010 |
| −7 | 1001 | 0001 |
| −8 | 1000 | 0000 |

Table 4 below depicts the addition of various sets of two 3-bit numbers represented in the 3-bit 2's complement and offset 2's complement number systems.

TABLE 4

| CASE | | DECIMAL | 2'S COMPLEMENT | OFFSET 2'S COMPLEMENT |
|---|---|---|---|---|
| 1 | ADDEND | 2 | 010 | 110 |
|   | AUGEND | 1 | 001 | 101 |
|   | SUM | 3 | 0011 | 1011 |
| 2 | ADDEND | −2 | 110 | 010 |
|   | AUGEND | −1 | 111 | 011 |
|   | SUM | −3 | 1101 | 0101 |
| 3 | ADDEND | 3 | 011 | 111 |
|   | AUGEND | 1 | 001 | 101 |
|   | SUM | 4 | 0100 | 1100 |
| 4 | ADDEND | −4 | 100 | 000 |
|   | AUGEND | −4 | 100 | 000 |
|   | SUM | −8 | 1000 | 0000 |
| 5 | ADDEND | 2 | 010 | 110 |
|   | AUGEND | −2 | 110 | 010 |
|   | SUM | 0 | 1000 | 1000 |

The addition of M x-bit numbers will yield a x-bit sum and a $(\log_2 M)$-bit carry. Therefore the sums of Table 4 are 4-bit numbers comprising the 3-bit sum and $(\log_2 2)$-bit (i.e. 1-bit) carry. With the exception of the 2's complement sum of case 5 (which will be discussed below), the four-bit sums may be verified by referring to the four-bit number systems depicted in Table 3.

Case 1 demonstrates the addition of two positive numbers. The resulting sums are positive which may be verified by the MSB. In 2's complement space, a zero in the MSB signifies a positive number. However, in offset 2's complement space, a one in the MSB signifies a positive number.

Case 2 demonstrates the addition of two negative numbers. The resulting sums are negative which may be verified by the MSB. Once again, in 2's complement space, a one in the MSB signifies a negative number. However, in offset 2's complement space, a zero in the MSB signifies a negative number.

An overflow condition exists when the magnitude of the sum resulting from the addition of M x-bit numbers is so great that the number can no longer be expressed in the x-bit number system. Case 3 demonstrates the addition of two positive 3-bit numbers resulting in an overflow. The resulting sums are positive which may be verified by the MSB and are properly represented as 4-bit numbers in their respective number systems. However, the resulting sum exceeds the maximum value that can be expressed in the 3-bit systems. A similar overflow condition exists in Case 4 which demonstrates the addition of two negative numbers resulting in a negative overflow. The resulting sums are negative which may be verified by the MSB and are properly represented as 4-bit numbers in their respective number systems. However, the resulting sum is less than the minimum value that can be expressed in the 3-bit systems.

In 2's complement arithmetic, the output of a 2's complement adder must keep track of four different values in order to create a meaningful sum. The four values are: a final sum, a final sign bit, a carry into the sign bit and a carry out of the sign bit (i.e. Bit N+1). In addition to requiring four parameters to evaluate the final sum, this type of adder has the added disadvantage that one of those parameters (the carry into the sign bit) is an internal parameter and not necessarily available on the output. Case 5 represents the addition of a positive and a negative number. There is an ambiguity in the resulting 2's complement sum, but not in the resulting offset 2's complement sum. It may be seen from comparison of the 2's complement sums of Cases 4 and 5 that the output of the adder is the same for both adds. In the Case 5 2's complement addition there is a carry into the sign bit and the result is an illegal zero. In the Case 4 2's complement addition there is no carry into the sign bit and the result is a legal negative eight. The output logic would need to keep track of the (internal) carry into the sign bit in order to differentiate between the two results. The offset 2's complement number space uses a modified 2's complement form resulting in a much simpler adder.

In order to evaluate a sum using offset 2's complement, only three values are required: a final sum, a final sign bit and a carry out of the sign bit (i.e. bit N+1). In an addition using offset 2's complement numbers, a carry into the sign bit is not required and all the parameters can be found in the final sum. This is an especially important feature for an adder which is broken into various stages. When an addition is made using ordinary 2's complement space, internal carry bits from one stage must be carried over to the next stage and modified based on operations of all the following stages. These extra signal lines and the circuitry necessary to propagate them increase the amount of area on an IC chip which must be dedicated to use by the adder. Furthermore, an adder that operates in offset 2's complement space will result in decreased propagation time, circuit complexity and number of components over an adder which operates in ordinary 2's complement space.

A benefit of offset 2's complement addition over ordinary 2's complement addition may be easily understood by comparing the sums derived in Table 4. The offset 2's complement add always results in distinct sums whereas, in Cases 4 and 5, the 2's complement sums were identical. One can tell immediately from an offset 2's complement final sum what number is represented without the need of any internal information.

The result of adding two N-bit numbers in offset 2's complement space is always N+1 bits. The sum can be passed directly onto the next stage as a meaningful (N+1) bit number. If the system is only able to propagate N bits, the final sum may easily be evaluated as follows.

Conceptually, the conversion process is simplified by considering the N+1 bit as the sign bit and the Nth bit as an overflow bit. With this format, a one in the sign bit indicates a positive value and a zero indicates a negative value. Sign detection in offset 2's complement addition is very simple. On the other hand, 2's complement addition requires using the sign bit and two carry bits (one is internal) to determine the correct sign. Furthermore, in offset 2's complement, bit N is the overflow bit. If the sign bit and the overflow bit are equal, then an overflow has occurred. Again, this is a very simple condition upon which to test because the test only requires a two-input exclusive-OR gate. (2's complement needs two carry bits and again one of these is an internal bit.)

In the two number addition case, the application of this technology is extremely simple and again, it's value is found not in creating the final sum but in the ability to evaluate the final sum. If the number system for the unit is not dictated by some external conditions, then the offset 2's complement system can be used directly. However, if the rest of the unit uses 2's complement then the following circuit of FIG. 1 can be used for a two input adder which requires 2's complement inputs and outputs.

Referring to FIG. 1, $A_{0-3}$ represents the 4-bit addend and $B_{0-3}$ represents the 4-bit augend. The result is a 5-bit number formed by the 4-bit sum ($S_{0-4}$) and 1-bit carry ($C_0$). Two inverters 10-11 above 4-bit adder 12 of FIG. 1 are used to convert the 2's complement inputs A and B into offset 2's complement values by inverting the MSBs $A_3$ and $B_3$ respectively. Four-bit adder 12 itself is any off-the-shelf 4-bit adder. Inverter 13 on the carry out bit ($C_0$) is used to convert the offset 2's complement sum back to a 2's complement number. The configuration of FIG. 1 (2's complement conversion before and after the same adder) would never be used in practice since the benefit of offset 2's complement arithmetic would not be realized. However, it serves as an introductory example of adder circuitry for offset 2's complement numbers. Offset 2's complement addition is most useful when more than two numbers are added together.

It is important to keep in mind that the operation which provides the benefit of offset 2's complement addition over 2's complement addition is the addition of an offset of $2^{N-1}$ to each 2's complement addend. This offset permits the addition of signed numbers as if they were positive values. The rules for addition of offset 2's complement numbers outlined above apply only to the addition of two N bit values. The rules must change when adding more than two numbers (although the benefits are the same). For example when adding three 4-bit numbers in offset 2's complement space, each addend X is actually X+8 and the final sum must be evaluated as SUM-(3×8). Therefore 24 must be subtracted from the final result. In practice, this is a simple operation. Negative 24 in 6-bit offset 2's complement space is written as 01000 which can easily be added to the result. As before, if the logic can handle the full 6 bits, all of the above sums can simply be evaluated as a 6 bit offset 2's complement number.

Figure 2:
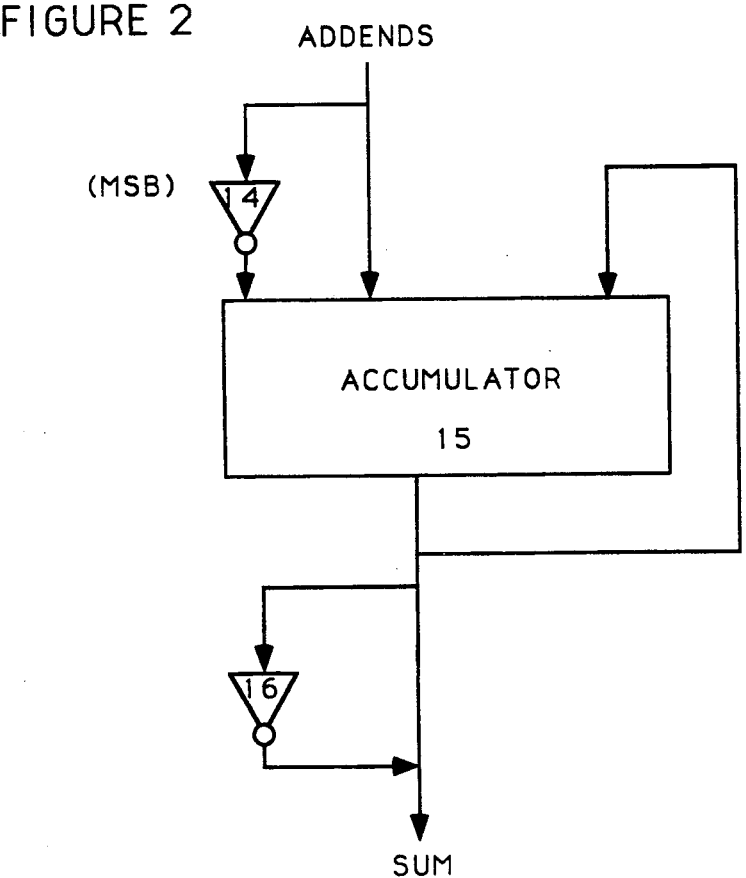
FIG. 2 illustrates offset 2's complement addition of several numbers using an accumulator circuit.

A much more practical configuration than that of FIG. 1, is the one shown in FIG. 2 where Z numbers are to be added together to form a final sum. This process is used extensively in every application of DSP. For instance a digital Finite-duration Impulse-Response (FIR) filter performs an addition of Z (N) bit values where Z is the number of taps in the filter. In FIG. 2, each of Z 2's complement addends are converted to offset 2's complement by inverting the MSB using inverter 14 and then the offset 2's complement number is input to accumulator circuit 15. The addends are input sequentially. The sum of the first two addends is calculated and added to the third addend. Each successive addend is added to the resulting sum from the previous input until all numbers have been summed. Since the offset 2's complement process adds $2^{N-1}$ to each addend, adding Z numbers together will produce a final sum which has the value $(2^{N-1})$ (Z) added to it. The final output sum may be converted back to 2's complement space by substracting $(2^{N-1})$ (Z). If Z is a power of two, then the conversion back to 2's complement space is simply a substraction of $2^{N-1}$ shifted by $\log_2(Z)$. Hence, if Z is a power of two, the shift of the sum from accumulator circuit 15 to 2's complement space may be achieved by using inverter 16 to complement bit $\{[N-1]+[(\log_2(Z))-1]\}$ of the sum. For instance, if 32 8-bit numbers (Z=32, N=8) are to be added together using offset 2's complement arithmetic, then the final sum would have the value:

Final
$$\text{Sum} = \text{Sum} + (32)(2^{N-1}) = \text{Sum} + (32)(2^7) = \text{Sum} + (32)(128)$$

In order to produce the correct final 2's complement value, one would need to subtract (32)(128)=4096 from the result. This is easily done since 4096 represented in 12-bit offset 2's complement space is simply a 1 at bit 11 and zeros elsewhere.

The advantage to using offset 2's complement in the circuit of FIG. 2 is that there is no need to evaluate all the intermediate sums or keep track of the intermediate carrys as would be required if ordinary 2's complement addition were used.

The preferred embodiment of the present invention comprises a class of fast adders which can add M binary numbers that have a precision of N-bits where M and N can be any integer. The actual addition is accomplished in two stages.

The first stage (Stage I) reduces the operation from an add of M numbers to an add of a smaller number of numbers (preferably only two numbers). In order to accomplish this, each of the N-bit numbers is split into x-bit groups. If N/x is an integer then N/x represents the number of Stage I adders required. Otherwise (N/x)+1 Stage I adders will be needed. The adders are individual combinational logic circuits containing the truth table logic that would be required to perform an addition of M x-bit offset 2's complement numbers. Preferably very fast Programmable Read Only Memory (PROM) are used as the Stage I adders.

Any combinational truth table can be programmed into the PROM, provided there are enough input (address) lines. Therefore, a characteristic of each PROM is that $$(M)(x) \leq (\text{Number of PROM addresses})$$

where (M)(x) represents the quantity of bits to be added in a particular PROM (i.e. M numbers, each number being x bits in length).

For example: In order to add four (M=4) 15-bit numbers (N=15) with five PROM's, each 15-bit number could be broken into 3-bit groups [(15/x)=5; x=3]. Then each PROM would need at least (4)(3)=12 address lines. This would result in the Stage I circuit of FIG. 3.

Figure 3:
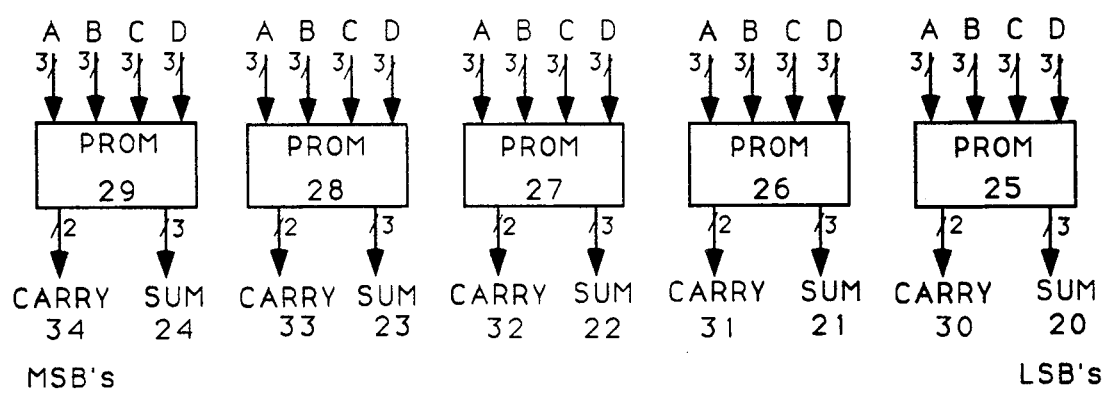
FIG. 3 illustrates a typical Stage I circuit showing the addition of four 15 bit numbers.

In FIG. 3 each of the four input numbers A, B, C and D are split into five three-bit groups of contigous order. Equivalent-ordered three-bit groups of the three inputs are added together in a PROM for that order group and a five-bit intermediate sum (consisting of a three-bit sum and two-bit carry) is provided as output by the PROM. In this manner, five PROMs provide as output five intermediate sums corresponding to the five three-bit groups of contiguous order.

Each PROM 25–29 of the example of FIG. 3 generates a three-bit Sum 20–24 and a two-bit Carry 30–34. In general, adding M x-bit numbers together will produce an x-bit Sum and a $(\log_2 M)$-bit carry. Stage II of the adder must add the carry bit(s) out of one PROM to the sum from the next contiguous PROM and produce a single result. A proper orderness is maintained in Stage II because the LSB of the carry from one PROM has the same order as the LSB of the sum from the next PROM. In this way, no more than two bits are added together in an individual bit place in Stage II.

In the preferred embodiment, the inputs are formatted as signed values with three significant bits and 16 fractional bits. The output of the adder is a 16 bit unsigned quantity with two significant bits and 14 fractional bits. In general, fractional rounding to a particular rounding order is accomplished by adding one to the bit of order one less than the rounding order, then all bits of order less than the rounding order are dropped. For example, if the inputs A, B C and D of the Stage I circuitry of FIG. 3 had a fractional part of two bits or greater, rounding to the third LSB could be accomplished by adding a one to the next-to-least significant bit of sum 20 in PROM 10 of Stage I and then not providing the two LSBs of sum 20 as input to Stage II.

Since Stage I's function is to reduce the problem for Stage II down to a two number add, the following characteristic exists for this type of circuit:

$$(\log_2 M) \leq x$$

In other words, the number of carry bits must be less than or equal to the number of bits in the sum. However, it will be apparent to one skilled in the art that this characteristic may always be overcome by the reduction of the problem to the addition of two or more smaller sets of numbers which would then be combined using the teachings of the present invention.

Figure 4:
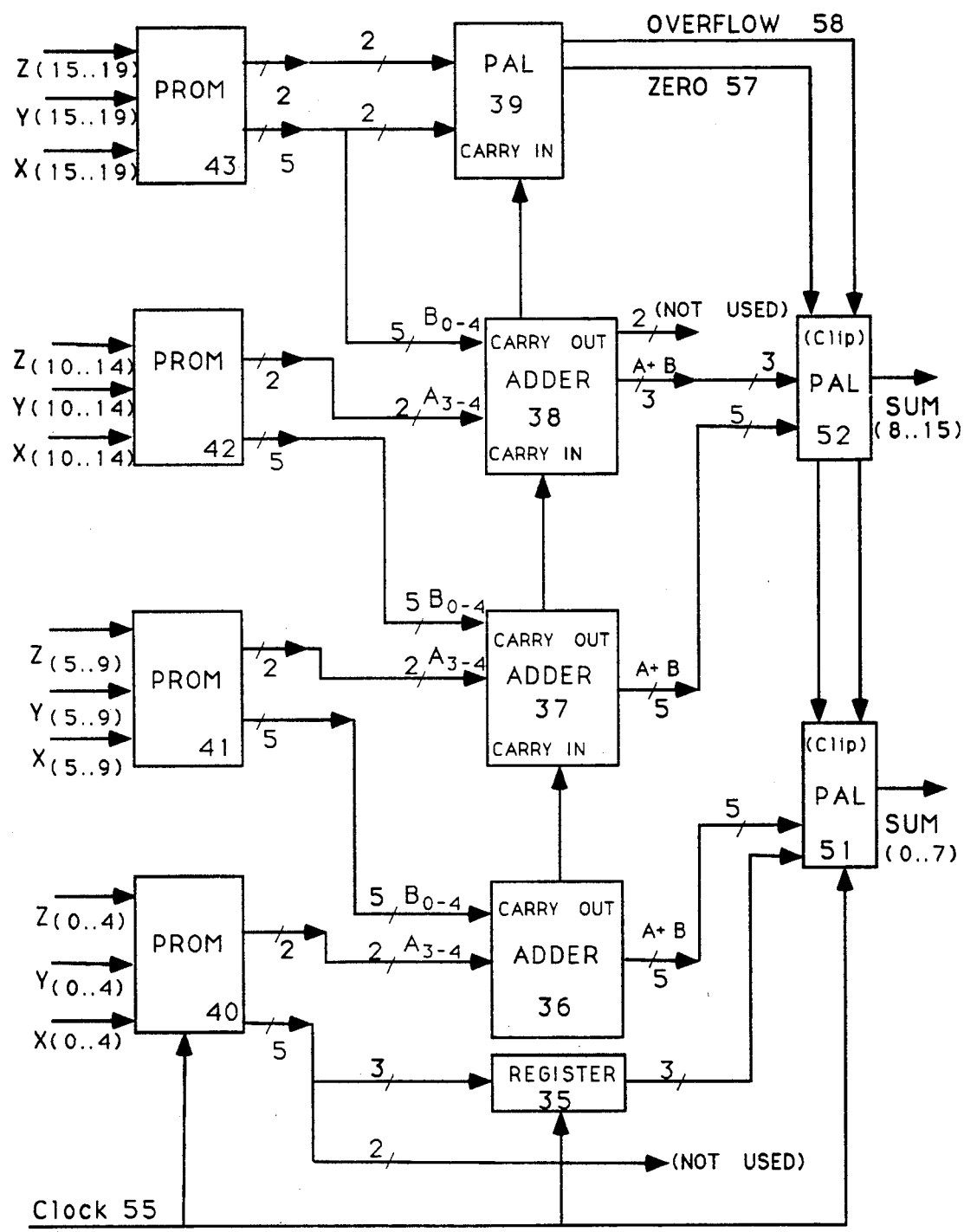
FIG. 4 depicts three stage circuitry to add three 20-bit numbers using three five-bit adders in Stage II.

It is the function of Stage II to add these intermediate sums and carrys together to produce a final sum. This may be done with 5-bit adder ICs as is depicted in FIG. 4. Although 5-bit adders have been employed in the circuitry of FIG. 4 to simplify the disclosure, it should be noted that 5-bit adders are not commonly available off-the-shelf. However, it will be readily apparent to one skilled in the art that, using the teachings of the present invention, the circuitry of FIG. 4 may be easily implemented using off-the-shelf 4-bit adders.

FIG. 4 depicts an embodiment of circuitry to implement the adder of the present invention. The circuitry can be divided into three stages. Stage I comprises four PROMs 40–43. There is a LSB PROM 40, a next-to-the-lowest-ordered group PROM 41, a next-to-the-highest-ordered group PROM 42 and a MSB PROM 43. The four PROMs 40–43 each have as input contiguous equivalent-ordered five-bit groups from each of the three binary input numbers X, Y and Z. Each of the four PROMs 40–43 has as output a five-bit sum and two-bit carry which are combined to form four intermediate sums, one per PROM. To round the resulting final total, a one is added to the next-to-the-lowest-order bit-place in the LSB PROM 40 and the two LSBs output by the LSB PROM 40 are discarded.

FIGS. 5a, 5b, 6a, 6b, 7a and 7b provide illustrative code written in the C programming language which may be used to define the combinational logic and program the Stage I PROMs 40–43 (FIG. 4). FIGS. 5a and 5b contain C code for the MSB PROM 43. The logic of the next-to-the-lowest-ordered group PROM 41 is identical to the logic of the next-to-the-highest-ordered group PROM 42. FIGS. 6a and 6b contain C code to define the combinational logic used to program Stage I PROMs 41–42. FIGS. 7a and 7b contain C code used to define the combinational logic of LSB prom 40.

As discussed earlier, an important aspect of the adder of the present invention is use of offset 2's complement arithmetic. In order to correctly evaluate the output of any 2's complement adder, the carry into the sign bit must be known. When adding more than two numbers this problem increases in complexity because now more than one bit may carry into the sign bit. The carrys into the sign bits which occurs within the PROM are not available for Stage II because they are carry's which occur within the Stage I PROM's. The big advantage that offset 2's complement provides is that all the information which is required to evaluate the sum is available in the sum itself. This eliminates the need for extra signals from the MSB PROM and reduces the complexity of the Stage II logic.

Stage II is comprised of a three-bit register 35, three five-bit adders 36–38 and a PAL (Programmable Array Logic) IC 39. Programmable Array Logic and Programmable Logic Arrays (PLAs) are two basic kinds of programmable logic which are well known in the art and widely used. They are ICs with many gates whose interconnections can be programmed (like ROMs) to form desired logic functions. PALs are programmed in a manner similar to the way that PROMs are programmed. While the present invention makes use of PALs in Stages II and III, it will be appreciated by one skilled in the art that Stages II or III could also be implemented in ROM or PLAs. Furthermore, if clipping is not desired, Stage III can be eliminated and simple adder ICs may be used in Stage II. As will be discussed below, the Stage II PAL IC 39 uses combinational logic to determine whether or not the output of Stage II should be clipped by Stage III.

The three MSB intermediate sum bits of the LSB PROM 40 intermediate sum remaining after the two LSBs have been discarded are in a final form that will be used in Stage III. This is because there is no carry bit from Stage I that has the same order as any of the three MSB intermediate sum bits of the LSB PROM 40 intermediate sum which must be added to them. Therefore, the three MSB intermediate sum bits of the LSB PROM 40 intermediate sum are stored in the three-bit register 35 of Stage II until they are needed in Stage III.

The 2-bit carrys of the Stage I PROMs 40–42 and the intermediate sums of Stage I PROMs 41–43 are combined in three five-bit adders 36–38 of Stage II. Five-bit adders 36–38 function as would an off-the-shelf four-bit adder 12 of the kind depicted in FIG. 1 except that, as their name implies, they add 5-bits instead of four. Each of the five-bit adders 36–38 of FIG. 4 is identical to the other two. Each of the five-bit adders 36–38 combines a two-bit carry ($A_{3-4}$) with a five-bit Stage I intermediate sum ($B_{0-4}$) to provide a five-bit sum (A+B) and one-bit carry. The five-bit adders 36–38 include a Lower-bit Adder 36, an Intermediate-bit adder 37 and a higher-bit Adder 38. The Lower-bit Adder 36 combines the two-bit carry from LSB PROM 40 with the five-bit intermediate sum of the next-to-lowest-ordered group PROM 41. The two carry bits of the LSB PROM 40 correspond in magnitude of order to the two LSBs of the next-to-lowest-ordered group PROM 41. Thus, the two carry bits of the LSB PROM 40 intermediate sum are combined in the Lower-bit Adder 36 with the five LSBs of the next-to-lowest-ordered group PROM 41 intermediate sum to yield the five LSBs of the final sum of order immediately greater than that of the values stored in the three-bit register 35. A carry out bit is also output by the lower-bit adder 36. The carry out bit of the lower-bit adder 36 is input with the two MSBs (the carry bits) of the next-to-the-lowest-ordered group PROM 41 intermediate sum and the five LSBs of the next-to-the-highest-ordered group PROM 42 intermediate sum to the intermediate-bit adder 37 to yield the next five ordered bits of the final sum and a carry bit. Similarly, the carry out bit of the intermediate-ordered adder 37 is input with the two MSBs of the next-to-the-highest-ordered group PROM 42 intermediate sum and the five LSBs of the MSB PROM 43 intermediate sum to the higher-bit adder 38 to yield the next five ordered bits of the final sum and a carry bit. Finally, the carry out bit of the higher-bit adder 38 is input with the four MSBs of the MSB PROM 43 intermediate sum in the Stage II PAL 39 to yield the two clipping enable signals (zero 57 and overflow 58) which are provided as input to Stage III. The Stage II PAL 39 uses the four MSBs to evaluate the final sum. Since we have added three 20-bit numbers, the sum contains an extra value of $(3)(2^{20-1})$ which is $(3)(2^{19})$. Looking at the top four bits (MSBs) this corresponds to a value of 0110. Therefore, any sum which has a value less than this (e.g., 0101, 0100, etc.) is a negative number. Any sum with the four MSBs equal to, or greater than, 1010 is greater than $2^{19}$ bits and is an overflow condition.

Stage III includes a LSB Stage III clipping PAL 51 and a MSB Stage III clipping PAL 52. The LSB Stage III clipping PAL 51 has as input the eight LSBs of the final sum and the zero 57 and overflow 58 clipping enable signals. Similarly, the MSB Stage III clipping PAL 52 has as input the eight MSBs of the final sum and the zero 57 and overflow 58 clipping enable signals. If neither the zero 57 nor the overflow 58 clipping enable signals are asserted, the LSB Stage III clipping PAL 51 will provide as output the eight LSBs of the final sum and the MSB Stage III clipping PAL 52 will provide as output the eight MSBs of the final sum together forming the 16-bit final sum. If the zero 57 clipping enable signal is asserted, clipping PALS 51 and 52 will provide as a combined output a 16-bit final sum which has been set to zero. If the overflow 58 clipping enable signal is asserted, clipping PALS 51 and 52 will provide as a combined output a 16-bit final sum which has been set to a predetermined upper threshold value.

The design is pipelined so that each of the three stages is registered. Clock signals are provided by a pixel clock 55.

Figure 8:
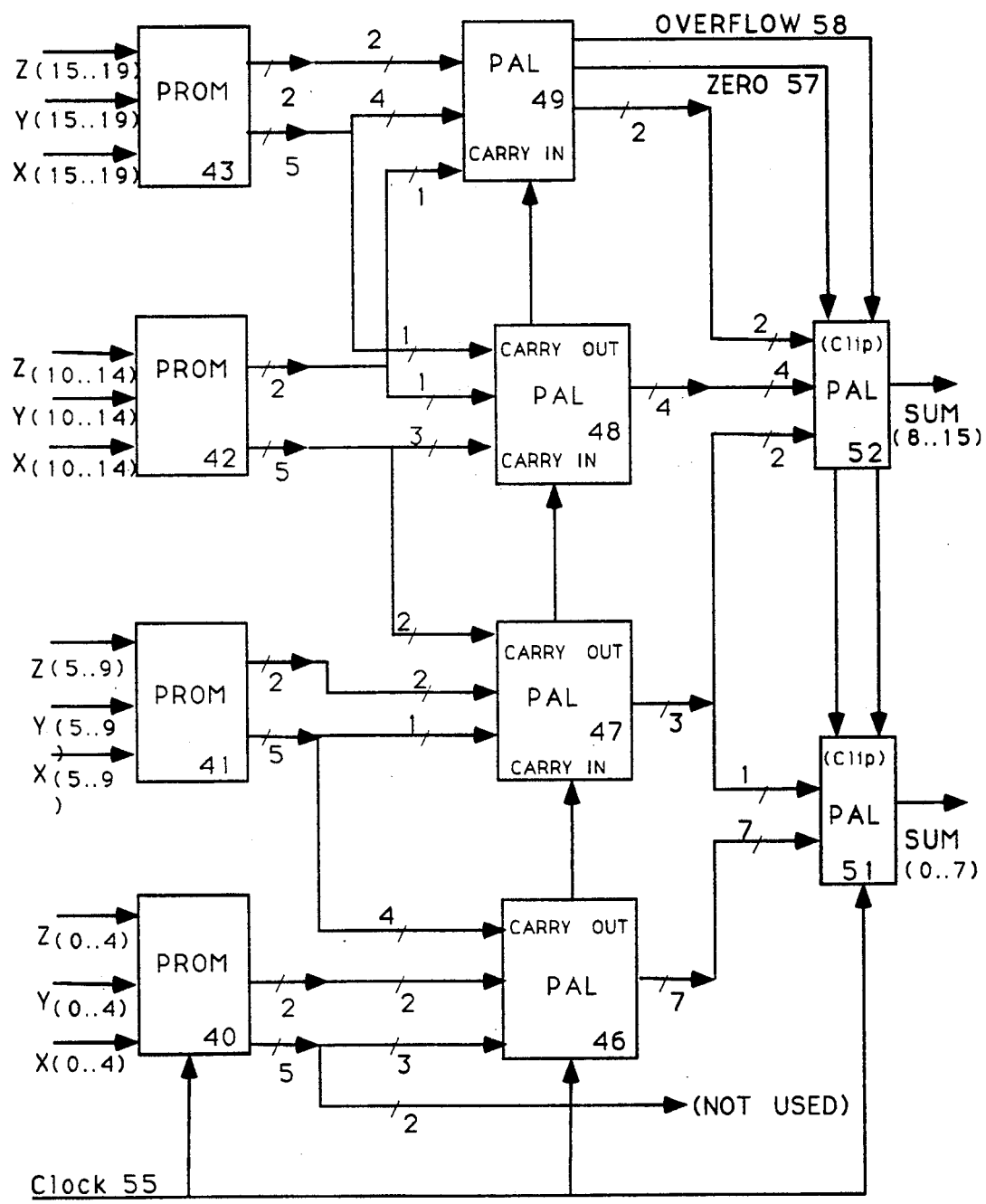
FIG. 8 illustrates an alternate embodiment of the circuitry of a three input 20-bit adder of the present invention.

The circuitry of FIG. 4 achieves the objectives of the preferred embodiment of the present invention. However, in the alternate preferred embodiment of the present invention depicted in FIG. 8, Stage II adds are accomplished using PAL's instead of five-bit adders. In FIG. 8, Stages I and III operate essentially the same way as they did in the circuitry of FIG. 4. However, in FIG. 8, the Stage II circuitry and its connection to Stages I and III differs from that of FIG. 4.

FIG. 8 depicts the alternate preferred embodiment circuitry to implement the adder of the present invention. The circuitry can be divided into three stages. Stage I comprises four PROMs 40–43. There is a LSB PROM 40, a next-to-the-lowest-ordered group PROM 41, a next-to-the-highest-ordered group PROM 42 and a MSB PROM 43. The four PROMs 40–43 each have as input contiguous equivalent-ordered five-bit groups from each of the three binary input numbers X, Y and Z. Each of the four PROMs 40–43 has as output a five-bit sum and two-bit carry which are combined to form four intermediate sums, one per PROM. To round the resulting final total, a one is added to the next-to-the-lowest-order bit-place in the LSB PROM 40 and the two LSBs output by the LSB PROM 40 are discarded.

The intermediate sum bits remaining after the two LSBs of the LSB PROM 40 intermediate sum have been discarded are combined in the four PALs 46–49 of Stage II. These four PALs 46–49 include a LSB Stage II PAL 46, a next-to-the-lowest-ordered group Stage II PAL 47, a next-to-the-highest-ordered group Stage II PAL 48 and a MSB Stage II PAL 49. The two carry bits of the LSB PROM 40 correspond in magnitude of order to the two LSBs of the next-to-the-lowest-ordered group PROM 41. Thus, the seven MSBs of the LSB PROM 40 intermediate sum are combined in the LSB Stage II PAL 46 with the four LSBs of the next-to-lowest-ordered group PROM 41 intermediate sum to yield the seven LSBs of the final sum and a carry out bit. The carry out bit of the LSB Stage II PAL 46 is input with the three MSBs of the next-to-the-lowest-ordered group PROM 41 intermediate sum and the two LSBs of the next-to-the-highest-ordered group PROM 42 intermediate sum in the next-to-the-lowest-ordered group Stage II PAL 47 to yield the next three ordered bits of the final sum and a carry bit. Similarly, the carry out bit of the next-to-the-lowest-ordered group Stage II PAL 47 is input with the next four higher ordered bits of the next-to-the-highest-ordered group PROM 42 intermediate sum and the LSB of the MSB PROM 43 intermediate sum in the next-to-the-highest-ordered group Stage II PAL 48 to yield the next four ordered bits of the final sum and a carry bit. Finally, the carry out bit of the next-to-the-highest-ordered group Stage II PAL 48 is input with the MSB of the next-to-the-highest-ordered group PROM 42 intermediate sum and the six MSBs of the MSB PROM 43 intermediate sum in the MSB Stage II PAL 49 to yield the two MSBs of the final sum. Furthermore, the MSB Stage II PAL 49 provides as output two clipping enable signals (zero 57 and overflow 58) which are provided as input to Stage III. Choice of the division of logic among Stage II PALs 46–49 was a function of the number of product terms available within the PALs.

Stage III includes a LSB Stage III clipping PAL 51 and a MSB Stage III clipping PAL 52. The LSB Stage III clipping PAL 51 has as input the eight LSBs of the final sum and the zero 57 and overflow 58 clipping enable signals. Similarly, the MSB Stage III clipping PAL 52 has as input the eight MSBs of the final sum and the zero 57 and overflow 58 clipping enable signals. If neither the zero 57 nor the overflow 58 clipping enable signals are asserted, the LSB Stage III clipping PAL 51 will provide as output the eight LSBs of the final sum and the MSB Stage III clipping PAL 52 will provide as output the eight MSBs of the final sum together forming the 16-bit final sum. If the zero 57 clipping enable signal is asserted, clipping PALS 51 and 52 will provide as a combined output a 16-bit final sum which has been set to zero. If the overflow 58 clipping enable signal is asserted, clipping PALS 51 and 52 will provide as a combined output a 16-bit final sum which has been set to a predetermined upper threshold value.

The design is pipelined so that each of the three stages is registered. Clock signals are provided by a pixel clock 55.

Figure 9:
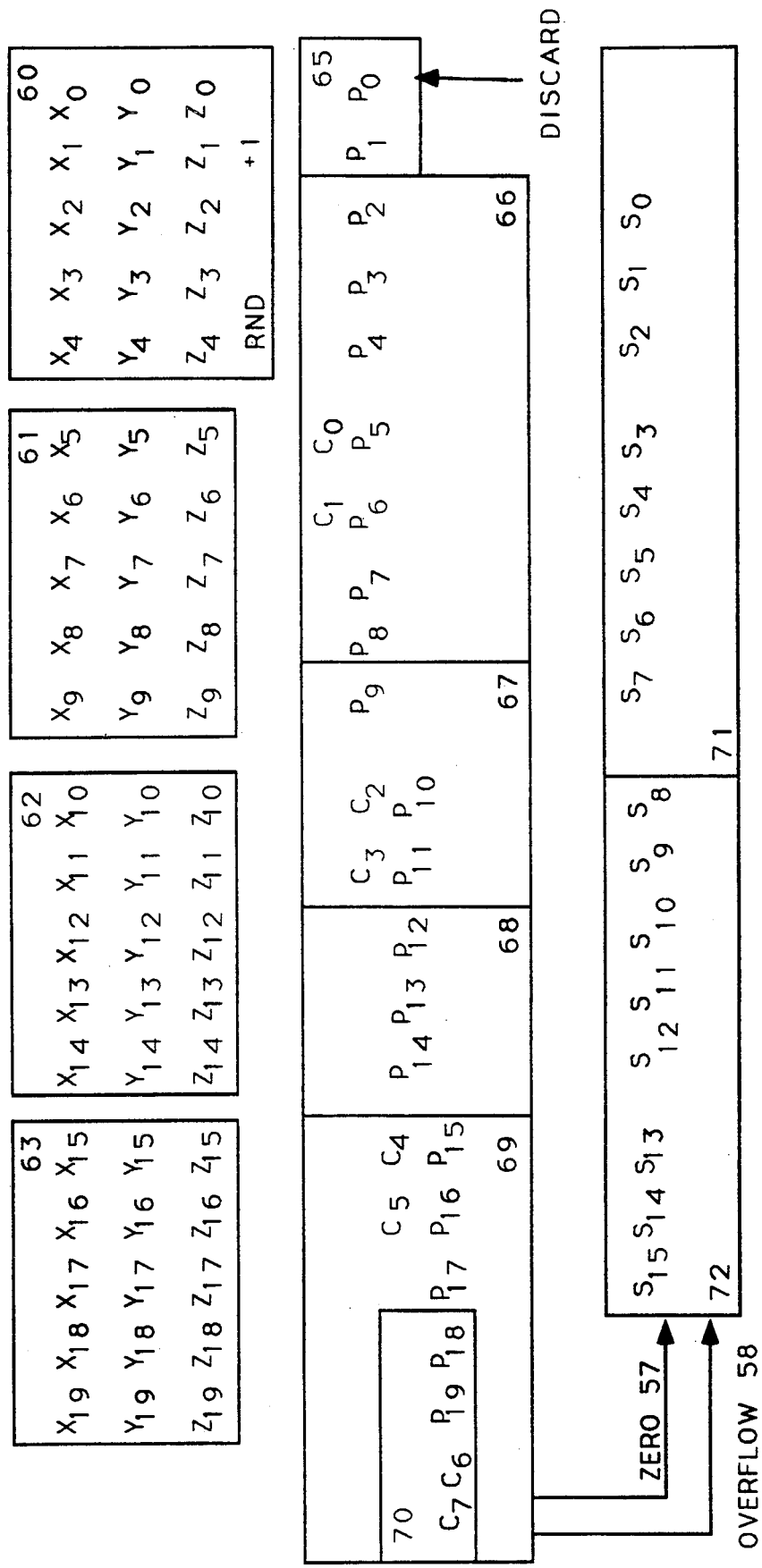
FIG. 9 demonstrates the three stage process of the three input 20-bit adder described in FIG. 8.

FIG. 9 provides a visual representation of an add operation using the adder of the present invention depicted in FIG. 8. Referring to FIG. 9, the add has been broken into its three stages of operation. Each stage is registered by pixel clock 55. $X_{(19..0)}$, $Y_{(19..0)}$, $Z_{(19..0)}$ are three 20-bit addends. During Stage I, each of the four PROM's 40-43 (FIG. 8) adds three five-bit numbers and produces a five-bit sum and two carry bits. Thus, addition of the five LSBs ($X_{(0..4)}$, $Y_{(0..4)}$, $Z_{(0..4)}$) of the three addends, as performed by the LSB PROM 40 (FIG. 8), is depicted in block 60 (FIG. 9) and results in the five-bit sum $P_{0..4}$ and two-bit carry $C_{0..1}$. Similarly, addition of the next two sets of five LSBs ($X_{(5..9)}$, $Y_{(5..9)}$, $Z_{(5..9)}$ and $X_{(10..14)}$, $Y_{(10..14)}$, $Z_{(10..14)}$), as performed by the next-to-the-lowest-ordered group Stage II PAL 47 (FIG. 8) and the next-to-the-highest-ordered group Stage II PAL 48 (FIG. 8), is depicted in logic blocks 61 and 62 (FIG. 9) and results in the five-bit sums $P_{5..9}$ and $P_{10..14}$ and two-bit carrys $C_{2..3}$ and $C_{4..5}$ respectively. Finally, addition of the five MSBs ($X_{(15..19)}$, $Y_{(15..19)}$, $Z_{(15..19)}$) of the three addends, as performed by the MSB PROM 43 (FIG. 8), is depicted in block 63 (FIG. 9) and results in the five-bit sum $P_{15..19}$ and two-bit carry $C_{6..7}$. A one is added to a rounding bit-place which has a predetermined rounding order. In the best mode implementation of the present invention, a one is added to the second bit (in LSB PROM 40 (FIG. 8)) to round up to the final 16-bit truncated result as is depicted in block 60 (FIG. 9). Truncation is accomplished by discarding the two LSBs ($P_{0..1}$) (block 65 (FIG. 9)) out of the LSB PROM 40 (FIG. 8). During Phase II, the seven bits from each PROM 40-43 (FIG. 8 are summed together (in four Stage II PAL's 46-49 (FIG. 4)) to produce a 16-bit result $S_{0..15}$ as is depicted in blocks 66-69 (FIG. 9) respectively. The MSB PAL 49 (FIG. 8) determines by testing information contained in the high-order group of contiguous ordered bits of the final sum (i.e. the top four bits ($P_{18..19}$ and $C_{6..7}$) depicted in block 70 (FIG. 9)) whether the result is acceptable, is less than zero or exceeds a threshold. If the output is not within limits then either zero 57 or overflow 58 clipping enable signal is sent to the output stage (Stage III) and the result $S_{0..15}$ is clipped to all zeros in the former case or all ones in the latter case by LSB Stage III clipping PAL 51 (FIG. 8) and MSB Stage III clipping PAL 52 (FIG. 8) as depicted in blocks 71 and 72 (FIG. 9) respectively.

While the invention has been described in conjunction with the preferred embodiment it is evident that numerous alternative modifications, variations and uses will be apparent to those skilled in the art in light of the foregoing description.

What is claimed is:

1. A circuit to produce an output sum of M N-bit input numbers, where M and N are integers greater than two, each of said M N-bit input numbers represented as N input bit signal lines wherein a voltage level on each of the input bit signal lines represents a value of either zero or one, each of the M N-input bit signal lines organized in ascending order of magnitude, said circuit comprising:

a plurality of first stage X-bit adder subcircuits for adding M input addends, the first stage adder subcircuits, Y in number, where Y is a positive integer of value equal to the quotient formed by dividing X into N for a predetermined integral value of X, and where X has a value at least as large as the base two logarithm of M, each of the first stage X-bit adder subcircuits coupled to X contiguous ordered input signal bit lines of each of the N bit input numbers, such that each of the first stage X-bit adder subcircuits adds X equal-ordered bit clusters of each of the M input numbers different in order from each of the other first stage X-bit adder subcircuits, each of the first stage X-bit adder subcircuits outputting X first stage sum bit signals and Z first stage carry bit signals, where Z is the smallest positive integer at least equal to the base two logarithm of M;

a second stage K-bit adder subcircuit for adding an addend and an augend, where K is a positive integer at least equal to $\{(N+Z)-X\}$, the K-bit adder having as input a K bit addend signal and a K bit augend signal, and having as output a K bit final sum signal, such that the output signal represents the K most significant bits of the output sum of the M N-bit input numbers, the K-bit adder coupled to each X-bit adder of the plurality of X-bit adders, except the X-bit adder which adds the least significant equal-ordered bit cluster of the M N-bit input numbers, in a manner whereby the $((Y-1)X)$ least significant bits of the K bit addened signal are formed by the first stage sum bit signals, and $((Y-1)Z)$ bits of the K bit augend signal are formed by the first stage carry bit signals, each of the first stage carry bit signals input to the K bit augend signal in the bit position that corresponds to the order associated with the first stage carry bit signal;

such that the N+Z bit output sum of M N-bit input numbers comprises the X first stage sum bit signals of the X-bit adder which adds the least significant X bit cluster of the M N-bit input numbers and the K bit final sum signal of the second stage K-bit adder subcircuit.

2. The circuit as defined in claim 1 where each of the M N-bit input numbers is an offset 2's complement number such that the output sum is an offset 2's complement number.

3. The circuit as defined in claim 2 where the second stage K-bit adder includes a means for inverting the most significant bit of the K bit final sum signal such that the output sum is a 2's complement number.

4. The circuit as defined in claim 1, where each of the M N-bit input numbers is a 2's complement number, and the X-bit adder which adds the most significant equal-ordered bit cluster of the M N-bit input numbers includes a means for inverting the most significant bit of the M N-bit input numbers to convert the M N-bit input numbers to offset 2's complement numbers such that the output sum is an offset 2's complement number.

5. The circuit as defined in claim 4 where the second stage K-bit adder includes a means for inverting the most significant bit of the K bit final sum singal such that the output sum is a 2's complement number.

6. The circuit as defined in claim 1 where the second stage K-bit adder is comprised of a plurality of B-bit adders, C in number, where C and B are integers, and the product of C and B is K, each of the B-bit adders having as input B contiguous ordered bits of the K bit addend signal, B bits of the K bit augened signal and a one bit input carry bit signal, and having as output a B bit sum signal of the K bit final sum signal and a one bit output carry bit signal, each of the K-bit adders, except the K-bit adder for the B most significant bit sum signal, coupled to the B-bit adder of next highest order B bit sum signal such that the one bit input carry bit signal of each individual K-bit adder of the K-bit adders, except the K-bit adder for the B most significant bit sum signal, provides the one bit output carry bit signal of the B bit adder of next highest order B bit sum signal.

7. The circuit as described in claim 1 where all the adder subcircuits are read only memory integrated circuits.

8. The circuit as described in claim 7 where all the adder subcircuits are programmable read only memory integrated circuits.

9. The circuit as described in claim 1, where the product of X and Y is greater than N, such that H plus N is equal to the product of X and Y, wherein the first stage X-bit adder which adds the most significant bits of the M N-bit input numbers has as input the H most significant bits of the M N-bit numbers, and adds the H most significant bits of the M N-bit input numbers, outputting H first stage H most significant bit sum bit signals and Z most significant bit first stage carry bit signals, the most significant H bit first stage adder coupled to the second stage K-bit adder.

10. The circuit as described in claim 1, where each of the M N-bit input numbers has a fractional part, and wherein the first stage X-bit adder subcircuit which adds a bit of order immediately below a predetermined rounding order, adds an additional one to the bit of order immediately below the predetermined rounding order, and all of the output sum bits of order less than the predetermined rounding order are ignored, such that the final sum is rounded to the predetermined rounding order.

11. The circuit as described in claim 1, further comprising a zero clipping means coupled to the X bit first stage sum bit signal of the lowest order first bit adder subcircuit, and the K bit final sum signal of the second stage K-bit adder subcircuit, the zero clipping means having as input the output sum and as output a zero clipped output sum, wherein the zero clipping means sets the zero clipped output sum to zero if the most significant bit of the final sum has a value of one.

12. The circuit as described in claim 1, further comprising an overflow clipping means coupled to the X bit first stage sum bit signal of the lowest order first bit adder subcircuit, and the K bit final sum signal of the second stage K-bit adder subcircuit, the overflow clipping means having as input the output sum and as output an overflow clipped output sum, wherein the overflow clipping means sets the overflow clipped output sum to a predetermined threshold if the final sum exceeds the predetermined threshold.

13. A circuit to produce an output sum of M N-bit input numbers, where M and N are integers greater than two, each of said M N-bit input numbers represented as N input bit signal lines wherein a voltage level on each of the input bit signal lines represents a value of either zero or one, each of the M N-input bit signal lines organized in ascending order of magnitude, said circuit comprising:

a plurality of first stage X-bit adder subcircuits for adding M input addends, the first stage adder subcircuits, Y in number, where Y is a positive integer of value equal to the quotient formed by dividing X into N for a predetermined integral value of X, and where X has a value at least as large as the base two logarithm of M, each of the first stage X-bit adder subcircuits coupled to X contiguous ordered input signal bit lines of each of the N bit numbers such that each of the first stage X-bit adder subcircuits adds X equal-ordered bit clusters of each of the M input numbers different in order from each of the other stage X-bit adder subcircuits, each of the first stage X-bit adder subcircuits outputting X first stage sum bit signals, and Z first stage carry bit signals, where Z is the smallest positive integer at least equal to the base two logarithm of M;

a second stage K-bit adder subcircuit, for adding an addend and an augend, where K is a positive integer at least equal to $\{(N+Z)-X\}$, the K-bit adder having as input a K bit addend signal and a K bit augend signal, and having as output a K bit final sum signal such that the output signal represents the K most significant bits of the output sum of the M N-bit input numbers, the K-bit adder coupled to each X-bit adder of the plurality of X-bit adders, except the X-bit adder which adds the least significant equal-ordered bit cluster of the M N-bit input numbers, in a manner whereby the $((Y-1)X)$ least significant bits of the K bit addend signal are formed by the first stage sum bit signals, and $((Y-1)Z)$ bits of the K bit augend signal are formed by the first stage carry bit signals, each of the first stage carry bit signals input to the K bit augend signal in the bit position that corresponds to the order associated with the first stage carry bit signal;

a plurality of sets of Z carry bit signal lines, where the number of sets of Z carry bit signal lines is Y in number, each set of the plurality of sets of Z carry bit signal lines coupling one of the first stage adder subcircuits to the second stage K-bit adder subcircuit, the carry bit signal lines disposed such that each of the sets of Z carry bit signal lines provides the first stage carry bit signals of an individual first stage adder to the K bit augend signal of the second stage K-bit adder;

a plurality of sets of X first stage sum bit signal lines, where the number of sets of Z carry bit signal lines is D in number, where D is equal to one less than Y, each of the sets of the plurality of sets of X first stage sum bit signal lines coupling one of the D highest ordered first stage adder subcircuits to the second stage K-bit adder subcircuits, the first stage sum bit signal lines disposed such that each of the sets of X first stage sum bit signal lines provides the first stage sum bit signals of an individual first stage adder to the K bit augend signal of the second stage K-bit adder;

such that the N+Z bit output sum of M N-bit input numbers comprises the X first stage sum bit signals of the X-bit adder which adds the least significant X bit cluster of the M N-bit input numbers, and the K bit final sum signal of the second stage K-bit adder subcircuit.

14. The circuit as defined in claim 13 where each of the M N-bit input numbers is an offset 2's complement number such that the output sum is an offset 2's complement number.

15. The circuit as defined in claim 14 where the second stage K-bit adder includes a means for inverting the most significant bit of the K bit final sum signal such that the output sum is a 2's complement number.

16. The circuit as defined in claim 13, where each of the M N-bit input numbers is a 2's complement number, and the X-bit adder which adds the most significant equal-ordered bit cluster of the M N-bit input numbers includes a means for inverting the most significant bit of the M N-bit input numbers to convert the M N-bit input numbers to offset 2's complement numbers, such that the output sum is an offset 2's complement number.

17. The circuit as defined in claim 16 where the second stage K-bit adder includes a means for inverting the most significant bit of the K bit final sum signal such that the output sum is a 2's complement number.

18. The circuit as defined in claim 13 where the second stage K-bit adder is comprised of a plurality of B-bit adders, C in number, where C and B are integers, and the product of C and B is K, each of the B-bit adders having as input B contiguous ordered bits of the K bit addend signal, B bits of the K bit augend signal, and a one bit input carry bit signal, and having as output a B bit sum signal of the K bit final sum signal, and a one bit output carry bit signal, each of the K-bit adders, except the K-bit adder for the B most significant bit sum signal, coupled to the B-bit adder of next highest order B bit sum signal, such that the one bit input bit carry bit signal of each individual K-bit adder of the K-bit adders, except the K-bit adder for the B most significant bit sum signal, provides the one bit output carry bit signal of the B bit adder of next highest order B bit sum signal.

19. The circuit as described in claim 13 where all the adder subcircuits are read only memory integrated circuits.

20. The circuit as described in claim 19 where all the adder subcircuits are programmable read only memory integrated circuits.

21. The circuit as described in claim 13, where the product of X and Y is greater than N, such that H plus N is equal to the product of X and Y, wherein the first stage X-bit adder which adds the most significant bits of the M N-bit input numbers, has as input the H most significant bits of the M N-bit numbers, and adds the H most significant bits of the M N-bit input numbers, outputting H first stage H most significant bit sum bit signals, and Z most significant bit first stage carry bit signals, the most significant H bit first stage adder coupled to the second stage K-bit adder.

22. The circuit as described in claim 13, where each of the M N-bit input numbers has a fractional part, and wherein the first stage X-bit adder subcircuit which adds a bit of order immediately below a predetermined rounding order adds an additional one to the bit of order immediately below the predetermined rounding order, and all of the output sum bits of order less than the predetermined rounding order are ignored, such that the final sum is rounded to the predetermined rounding order.

23. The circuit as described in claim 13, further comprising a zero clipping means coupled to the X bit first stage sum bit signal of the lowest order first bit adder subcircuit, and the K bit final sum signal of the second stage K-bit adder subcircuit, the zero clipping means having as input the output sum, and as output a zero clipped output sum, wherein the zero clipping means sets the zero clipped output sum to zero if the most significant bit of the final sum has a value of one.

24. The circuit as described in claim 13 further comprising an overflow clipping means coupled to the X bit first stage sum bit signal of the lowest order first bit adder subcircuit, and the K bit final sum signal of the second stage K-bit adder subcircuit, the overflow clipping means having as input the output sum, and as output an overflow clipped output sum, wherein the overflow clipping means sets the overflow clipped output sum to a predetermined threshold if the final sum exceeds the predetermined threshold.

25. A method to produce an output sum of M N-bit input numbers, where M and N are integers greater than two, each of said M N-bit input numbers represented as N input bit signal lines wherein a voltage level on each of the input bit signal lines represents a value of either zero or one, each of the M N-input bit signal lines organized in ascending order of magnitude, said circuit comprising the steps of:

dividing each of the N input bit signal lines of each of the M N-bit input numbers into Y distinct clusters of X contiguous ordered input signal bit lines, where X is a predetermined integral value having a value at least as large as the base two logarithm of M, and Y is the integral quotient formed by dividing X into N;

providing one of the clusters of X of contiguous ordered input signal bit lines for each of the M N-bit numbers to one X-bit adder of a plurality of first stage X-bit adder subcircuits for adding M input addends, each of the first stage X-bit adder subcircuits, Y in number, coupled to X contiguous ordered input signal bit lines of each of the N bit input numbers, such that each of the first stage X-bit adder subcircuits adds X equal-ordered bit clusters of each of the M input numbers different in order from each of the other first stage X-bit adder subcircuits, each of the first stage X-bit adder subcircuits outputting X first stage sum bit signals, and Z first stage carry bit signals, where Z is the smallest positive integer at least equal to the base two logarithm of M;

providing the first stage carry bit signals of the plurality of first stage X-bit adders, and the first stage sum bit signals of each of the X-bit adders of the plurality of X-bit adders, except the X-bit adder which adds the least significant equal-ordered bit cluster of the M N-bit input numbers, to a second stage K-bit adder subcircuit for adding an addend and an augend, where K is a positive integer at least equal to {(N+Z)−X}, the K-bit adder having as input a K bit addend signal and a K bit augend signal, and having as output a K bit final sum signal, such that the output signal represents the K most significant bits of the output sum of the M N-bit input numbers, the K-bit adder coupled to each X-bit adder of the plurality of X-bit adders, except the X-bit adder which adds the least significant equal-ordered bit cluster of the M N-bit input numbers, in a manner whereby the $((Y-1)X)$ least significant bits of the K bit addend signal are formed by the first stage sum bit signals, and $((Y-1)Z)$ bits of the K bit augend signal are formed by the first stage carry bit signals, each of the first stage carry bit signals input to the K bit augend signal in the bit position that corresponds to the order associated with the first stage carry bit signal;

such that the N+Z bit output sum of M N-bit input numbers comprises the X first stage sum bit signals of the X-bit adder which adds the least significant X bit cluster of the M N-bit input numbers, and the K bit final sum signal of the second stage K-bit adder subcircuit.

26. The method as defined in claim 25, where each of the M N-bit input numbers is an offset 2's complement number, such that the output sum is an offset 2's complement number.

27. The method as defined in claim 26, further comprising the step of inverting the most significant bit of the K bit final sum signal, such that the output sum is a 2's complement number.

28. The method as defined in claim 25, where each of the M N-bit input numbers is a 2's complement number, and further comprising the step of inverting the most significant bit of the M N-bit input numbers before providing them to the X-bit adder which adds the most significant equal-ordered bit cluster of the M N-bit input numbers to convert the M N-bit input numbers to offset 2's complement numbers, such that the output sum is an offset 2's complement number.

29. The method as defined in claim 28, further comprising the step of inverting the most significant bit of the K bit final sum signal, such that the output sum is a 2's complement number.

30. The method as defined in claim 25, where the second stage K-bit adder is comprised of a plurality of B-bit adders, C in number, where C and B are integers, and the product of C and B is K, each of the B-bit adders having as input B contiguous ordered bits of the K bit addend signal, B bits of the K bit augend signal and a one bit input carry bit signal, and having as output a B bit sum signal of the K bit final sum signal, and a one bit output carry bit signal, each of the K-bit adders, except the K-bit adder for the B most significant bit sum signal, coupled to the B-bit adder of next highest order B bit sum signal, such that the one bit input carry bit signal of each individual K-bit adder of the K-bit adders, except the K-bit adder for the B most significant bit sum signal, provides the one bit output carry bit signal of the B bit adder of next highest order B bit sum signal.

31. The method as described in claim 25 where all the adder subcircuits are read only memory integrated circuits.

32. The method as described in claim 31 where all the adder subcircuits are programmable read only memory integrated circuits.

33. The method as described in claim 25, where the product of X and Y is greater than N, such that H plus N is equal to the product of X and Y, wherein the first stage X-bit adder which adds the most significant bits of the M N-bit input numbers has as input the H most significant bits of the M N-bit numbers, and adds the H most significant bits of the M N-bit input numbers outputting H first stage H most significant bit sum bit signals, and Z most significant bit first stage carry bit signals, the most significant H bit first stage adder coupled to the second stage K-bit adder.

34. The method as described in claim 25, where each of the M N-bit input numbers has a fractional part, and further comprising the steps of:

adding an additional one within the first stage X-bit adder subcircuit which adds a bit of order immediately below a predetermined rounding order to the bit of order immediately below the predetermined rounding order; and, ignoring all of the output sum bits of order less than the predetermined rounding order, such that the final sum is rounded to the predetermined rounding order.

35. The method as described in claim 25 further comprising the step of setting the output sum to zero if the most significant bit of the final sum has a value of one within a zero clipping means, the zero clipping means coupled to the X bit first stage sum bit signal of the lowest order first bit adder subcircuit and the K bit final sum signal of the second stage K-bit adder subcircuit, the zero clipping means having as input the output sum, and as output a zero clipped output sum, wherein the zero clipping means sets the zero clipped output sum to zero if the most significant bit of the final sum has a value of one.

36. The method as described in claim 25, further comprising the step of setting the output sum to a predetermined threshold within an overflow clipping means if the output sum exceeds a predetermined threshold, the overflow clipping means coupled to the X bit first stage sum bit signal of the lowest order first bit adder subcircuit and the K bit final sum signal of the second stage K-bit adder subcircuit, the overflow clipping means having as input the output sum and as output an overflow clipped output sum, wherein the overflow clipping means sets the overflow clipped output sum to the predetermined threshold if the final sum exceeds the predetermined threshold.

* * * * *